(12) United States Patent
Ramey et al.

(10) Patent No.: US 6,756,971 B1
(45) Date of Patent: Jun. 29, 2004

(54) TOUCH PAD GUARD WITH OPTIONAL WRIST PAD

(76) Inventors: Steven E. Ramey, 1040 W. Lowell Ave., Haverhill, MA (US) 01831-1151; Johnny Jaskot, 10 Kimberly Rd., Hampstead, NH (US) 03841-2063

( * ) Notice: Subject to any disclaimer, the term of this patent is extended or adjusted under 35 U.S.C. 154(b) by 0 days.

(21) Appl. No.: 09/575,032

(22) Filed: May 19, 2000

(51) Int. Cl.$^7$ .................................................. G09G 5/00
(52) U.S. Cl. ...................... 345/173; 345/179; 345/168; 361/212
(58) Field of Search ............................. 345/168, 169, 345/179, 173; 361/683, 212, 687

(56) References Cited

U.S. PATENT DOCUMENTS

| | | | |
|---|---|---|---|
| 4,449,763 A | 5/1984 | Barnett ........................ | 312/208 |
| 5,346,164 A | 9/1994 | Allen .......................... | 248/118 |
| 5,465,090 A | 11/1995 | Deignan ...................... | 341/22 |
| 5,527,122 A | 6/1996 | Carter ......................... | 400/496 |
| 5,551,497 A | 9/1996 | Stanley ....................... | 150/154 |
| 5,570,268 A | 10/1996 | Selker ......................... | 361/683 |
| 5,596,481 A | 1/1997 | Liu et al. .................... | 361/683 |
| 5,748,728 A | 5/1998 | Ginsberg et al. ............ | 379/477 |
| 5,835,342 A | 11/1998 | Hunte ......................... | 361/681 |
| 5,953,199 A | 9/1999 | Owens ........................ | 361/212 |
| 6,195,255 B1 * | 2/2001 | Kim ............................ | 361/683 |
| 6,216,988 B1 * | 4/2001 | Hsu et al. .................... | 248/118 |
| 6,619,597 B1 * | 9/2003 | Sheppard ..................... | 248/118 |

OTHER PUBLICATIONS

Track Pad Savers, Track Pad Saver, (web page), World–Wide–Web.

* cited by examiner

*Primary Examiner*—Richard Hjerpe
*Assistant Examiner*—Kimnhung Nguyen
(74) *Attorney, Agent, or Firm*—Bourque & Associates P.A.

(57) ABSTRACT

A touch pad guard is used to guard a touch pad on a portable computer to prevent inadvertent contact with the touch pad by the user's hand. The touch pad guard includes a guard member having one or more closed side regions for preventing the user's hands from contacting the touch pad. The guard member also has an open bottom region and one or more open side regions for allowing the user's fingers to access the touch pad for controlling the cursor on the computer. In one embodiment, the touch pad guard further includes an attachment device that removably attaches the guard member to a surface of the computer keyboard housing. An optional wrist pad can be coupled to the touch pad guard for supporting the user's wrists while using the keyboard. The touch pad guard can also be integrally attached to the surface of the keyboard housing. The touch pad guard can also be retractable such that the touch pad guard moves to a retracted position when a portable computer is closed and moves to an in-use position when the portable computer is opened.

14 Claims, 7 Drawing Sheets

TOUCH PAD GUARD WITH OPTIONAL WRIST PAD

FIELD OF THE INVENTION

The present invention relates to computer touch pad guards and more particularly, to a computer touch pad guard for use with a laptop computer keyboard with an optional wrist pad.

BACKGROUND OF THE INVENTION

Laptop/notebook computers are commonly made with a touch pad located in front of the computer keyboard. Touch pads sense the inherent capacitance associated with a user's finger for controlling a cursor on the computer screen according to the movement of the user's finger. The computer mimics this movement and drags the cursor across the screen to any desired location. One example of a touch pad is disclosed in greater detail in U.S. Pat. No. 5,469,194, incorporated herein by reference.

The location of the touch pad in front of the keys on the keyboard, however, creates some problems. As the user types in a normal, relaxed position, the user's palm will often hit the touch pad and move the cursor unintentionally. The unintentional movement of the cursor to an unexpected location can cause a number of problems. For example, when using word processing software, the cursor might be relocated in the document causing words to be typed on the wrong line.

To prevent these problems, a user often will hold his/her wrists in an abnormal position to avoid the palm hitting the touch pad. This abnormal positioning of the user's wrists and hands can result in an increase in hand and wrist injuries, such as carpel tunnel syndrome.

Accordingly, there is a need for a touch pad guard that prevents inadvertent contact with a computer touch pad, for example, on a laptop/notebook keyboard, while allowing the user to access the touch pad with the fingers for movement of the cursor. A need also exists for a touch pad guard that incorporates a wrist pad for supporting the user's wrist and further preventing injury to the user's wrist or hand.

SUMMARY OF THE INVENTION

The present invention features a touch pad guard for preventing inadvertent contact with a computer touch pad. The touch pad guard comprises a guard member having an open bottom region for placement over the computer touch pad and at least one open side region for receiving at least one finger of a user to allow access to the touch pad. The guard member also has at least one closed side region for preventing inadvertent contact of a hand of the user with the computer touch pad. The touch pad guard further comprises an attachment device for attaching the guard member to a surface around the computer touch pad.

In one embodiment, the attachment device includes a strap attached to the guard member. The strap extends around a computer keyboard such that the guard member is positioned around the computer touch pad located on the computer keyboard. In another embodiment, the attachment device is removably attached to the surface around the touch pad. In a further embodiment, the attachment device is integrally attached to the surface around the touch pad.

In one embodiment, the touch pad guard member includes a closed top region, for example, having a rounded shape. The guard member can also include three closed side regions and one open side region. In another embodiment, the guard member includes two closed side regions and two open side regions. In a further embodiment, the guard member includes a single generally flat side that extends at an angle from the surface around the touch pad.

The present invention also features a combination touch pad guard and wrist pad apparatus for use on a keyboard having a touch pad. This apparatus comprises a touch pad guard member and a wrist pad attached to at least one side of the guard member and extending across a region of the keyboard adjacent to the touch pad. An attachment device attaches the guard member and wrist pad to the keyboard.

The present invention also features a combination portable computer with touch pad guard comprising a keyboard housing, a touch pad located on the keyboard housing, and a retractable touch pad guard member coupled to the keyboard housing. In one embodiment, the touch pad guard member is generally flat and is pivotably coupled to the keyboard housing. The touch pad guard member can also be spring biased to move from a retracted position into an in-use position when the portable computer is opened.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1A:
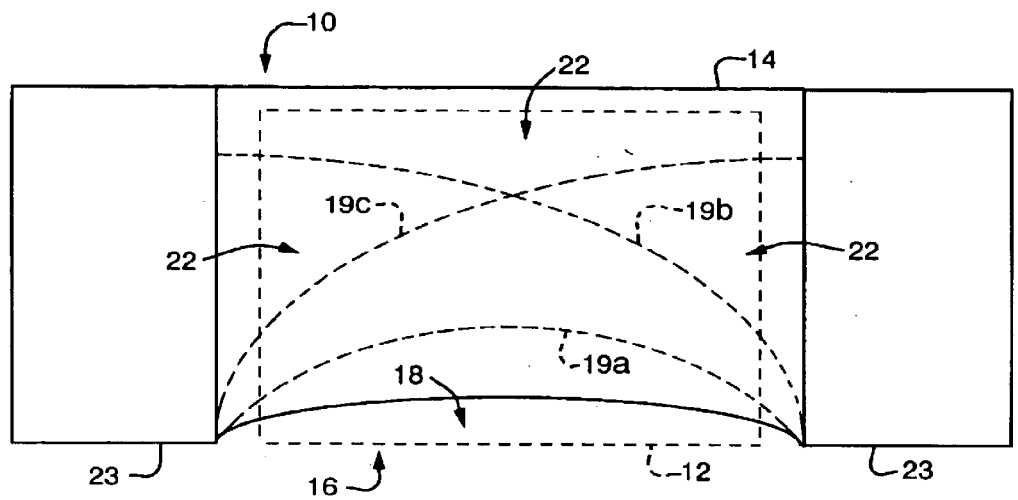
FIG. 1*a* is a top view of a touch pad guard, according to one embodiment of the present invention.
Figure 2A:
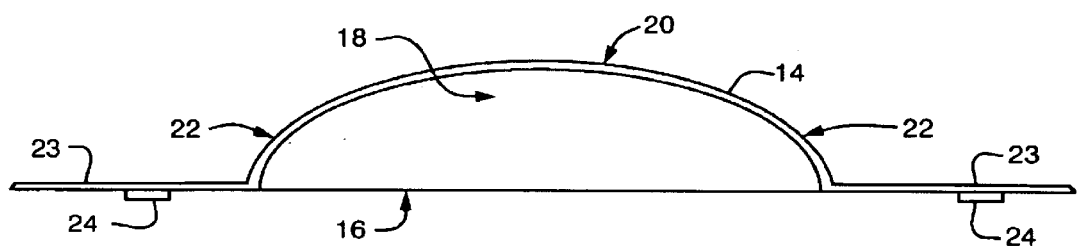
FIG. 2*a* is a front view of the touch pad guard shown in FIG. 1.
Figure 3A:
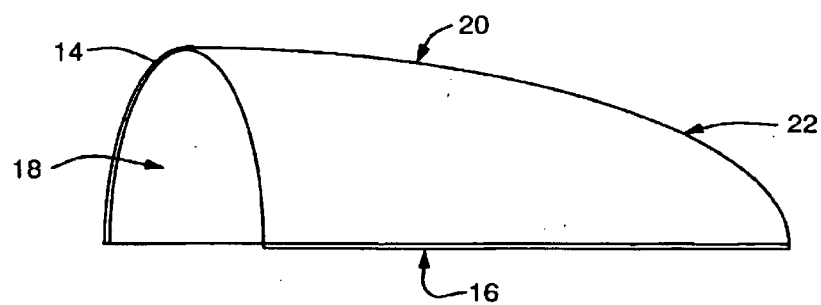
FIG. 3*a* is a side view of the touch pad guard shown in FIG. 1.
Figure 1B:
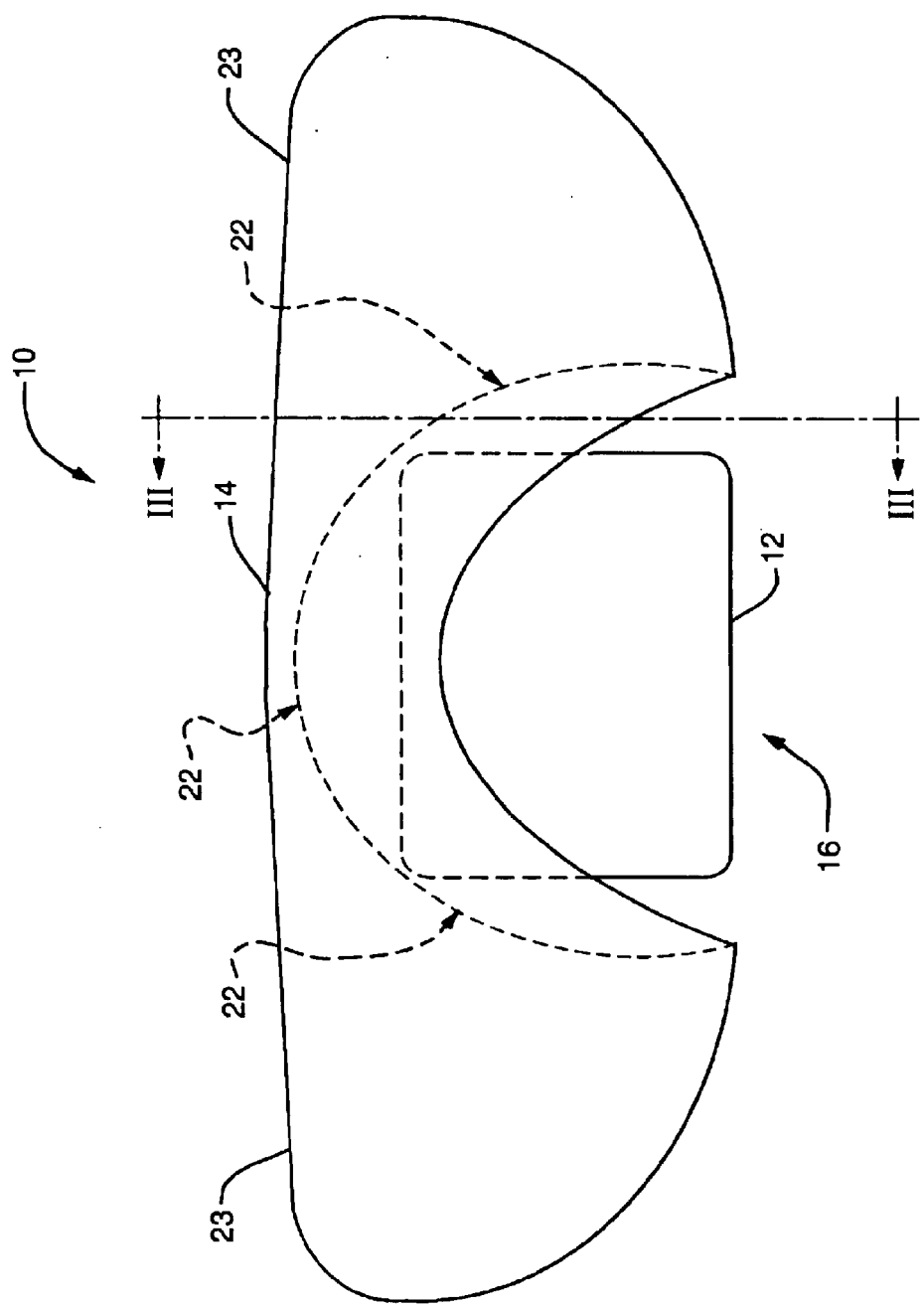
FIG. 1*b* is a top view of a touch pad guard, according to another embodiment of the present invention.
Figure 2B:
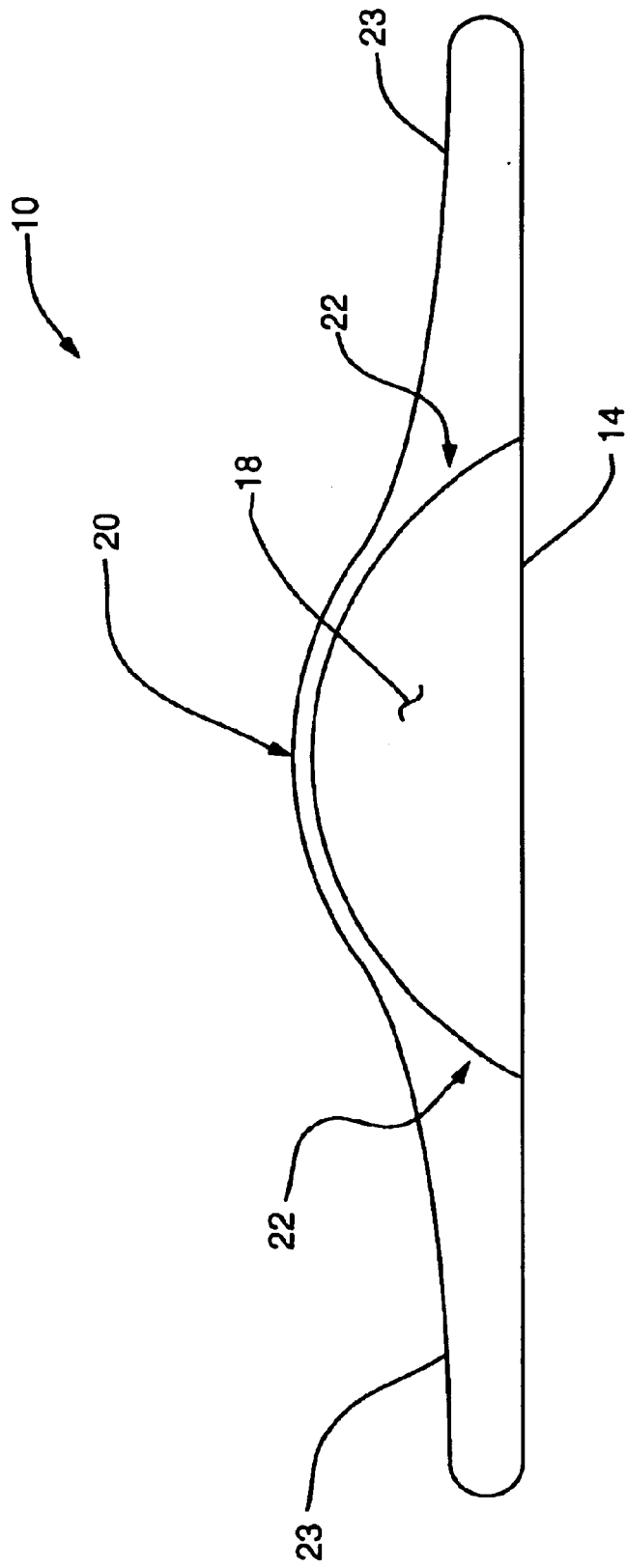
FIG. 2*b* is a front view of a touch pad guard, according to another embodiment of the present invention.
Figure 3B:
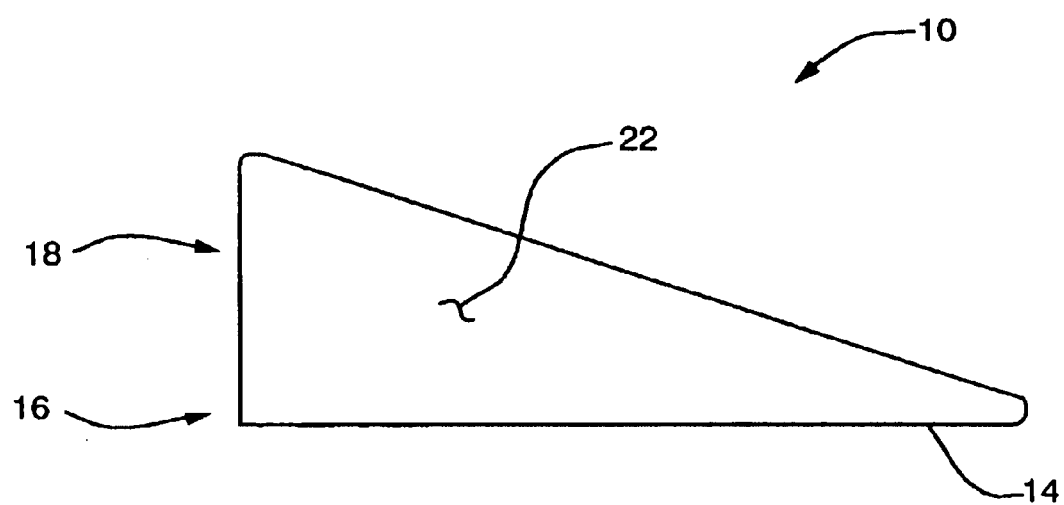
FIG. 3*b* is a cross-sectional view taken along line III—III of FIG. 2*b*.

A touch pad guard 10, FIGS. 1–3, according to the present invention, is used to prevent inadvertent contact with a touch pad 12 by the user's hand while allowing access to the touch pad 12 by the user's fingers. As is clearly shown in FIGS. 4–10, no portion of the touch pad guard 10 covers, obstructs, or overlies the plurality of keys 36 on the keyboard housing 32. Accordingly, the user has access to the plurality of keys 36 in the traditional manner and without interference from or having to remove the touch pad guard 10. Although the exemplary embodiments show the touch pad guard 10 on a keyboard of a portable computer, such as a laptop/notebook computer, the touch pad guard 10 could be used on any other type of computing device having a touch pad.

In one embodiment, the touch pad guard 10 includes a touch pad guard member 14 having an open bottom region 16, at least one open side region 18, a closed top region 20 and one or more closed side regions 22. Support members 23 can extend from the side regions 22 to support the touch pad guard 10 on the surface around the touch pad 12. The support members 23 can include non-slip strips 24 on the underside of the support members 23 to hold the guard 10 steady during use. In this embodiment, the top portion 20 is preferably rounded and the closed side regions 22 are preferably tapered. The open side region 18 is large enough to accommodate the user's fingers, thereby allowing access to the touch pad 12 for controlling the cursor. The guard member 14 is preferably made of a hard plastic material but other suitable materials can be used. In an alternative embodiment, the open side region 18 can be larger (as shown by broken line 19a). The open side region 18 can also be positioned partially to either the left (as shown by broken line 19b) or right (as shown by broken line 19c) side of the guard member 14, for example, to better accommodate a left handed or right handed user. The guard member 14 can also be made in other different shapes and sizes to accommodate the different sizes and locations of the touch pad and to accommodate different ergonomic preferences of the user.

Figure 4:
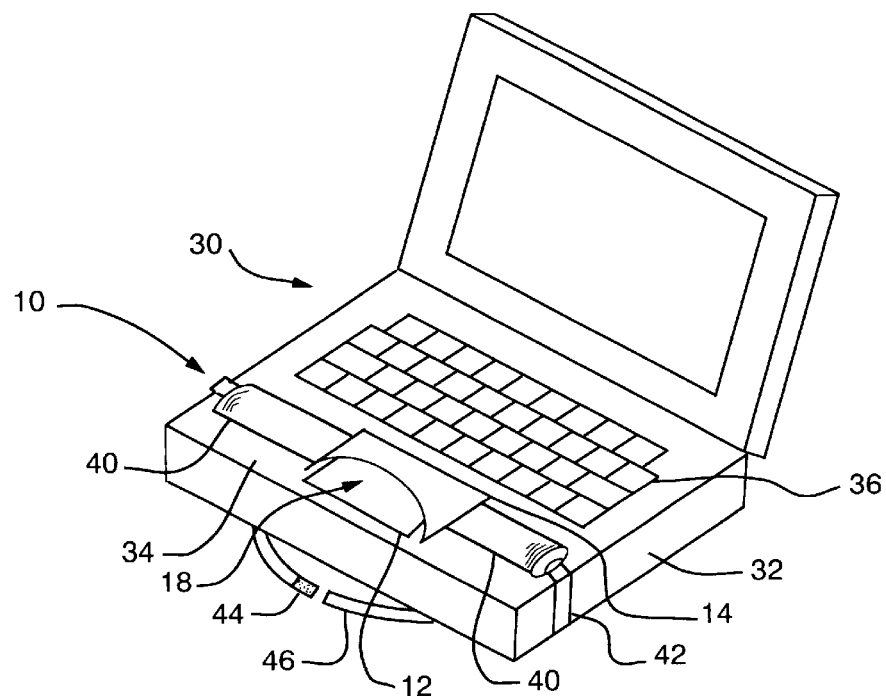
FIG. 4 is a perspective view of a touch pad guard with wrist pad on a portable computer keyboard, according to one embodiment of the present invention.
Figure 5:
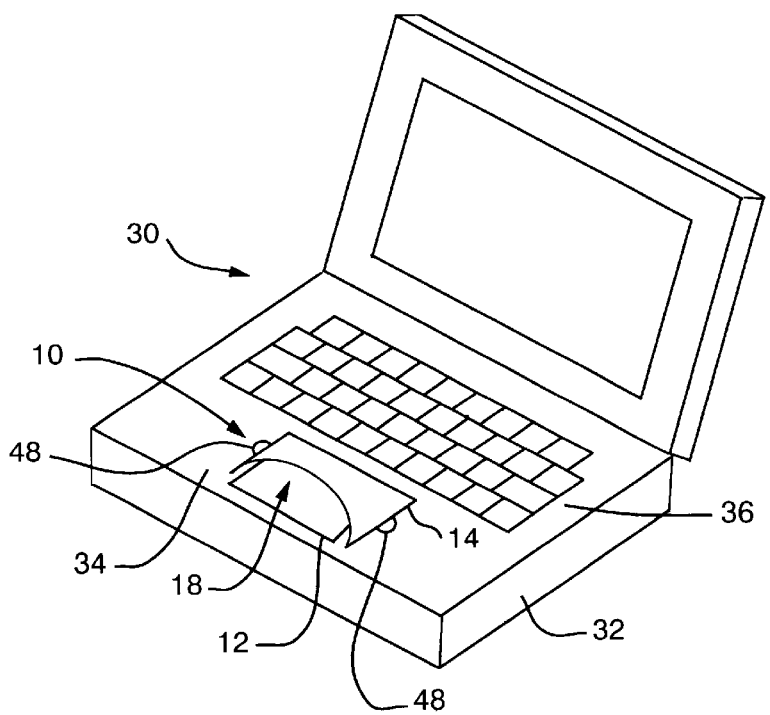
FIG. 5 is a perspective view of a touch pad removably coupled to a surface of a portable computer keyboard, according to another embodiment of the present invention.

In one embodiment, the touch pad guard 10, FIGS. 4–5, is in removably attached to a laptop/notebook computer 30 having the touch pad 12 located on a top surface 34 of keyboard housing 32 in front of the keys 36. The touch pad guard 10 is attached to the keyboard housing 32 such that the closed side regions 22 and closed top region 20 partially cover the touch pad 12. The touch pad guard 10 thereby prevents inadvertent contact of a user's hand with the touch pad 12 when the user is typing on the keys 36 while allowing the user's fingers to activate the touch pad 12 through the open side region(s) 18.

In one embodiment, a wrist pad 40, FIG. 4, is coupled to one or both sides of the touch pad guard member 14. The wrist pad 40 extends across the surface 34 of the keyboard housing 32 and supports the wrist of the user while typing on the keys 36. One example of the wrist pad 40 includes a gel-type or foam interior within an outer liner. Indicia or logos can be printed on the wrist pad 40, e.g., for marketing purposes.

In this embodiment, the touch pad guard member 14 and wrist pads 40 are attached to the keyboard housing 32 using a strap 42 that extends around the keyboard housing 32. The strap 42 can be made of a stretchable material as one continuous piece that stretches around the keyboard housing 32 or can have ends 44, 46 that are removably secured together, for example, using hook/loop fasteners.

In another embodiment, the touch pad guard 10, FIG. 5, is removably attached directly to the surface 34 of the keyboard housing 32. The touch pad guard 10 includes attachment devices 48, such as suction cups with a release mechanism or hook/loop fasteners, on the touch pad guard member 14 for removably attaching to the surface 34 of the keyboard housing 32. Although the embodiment shown in FIG. 5 has only the touch pad guard member 14 attached to the surface 34 of the keyboard housing 32, the combination touch pad guard member 14 and wrist pad 40 shown in FIG. 4 can also be attached to the surface 34 of the keyboard housing 32 in this way. Other suitable attachment devices can also be used.

Figure 6:
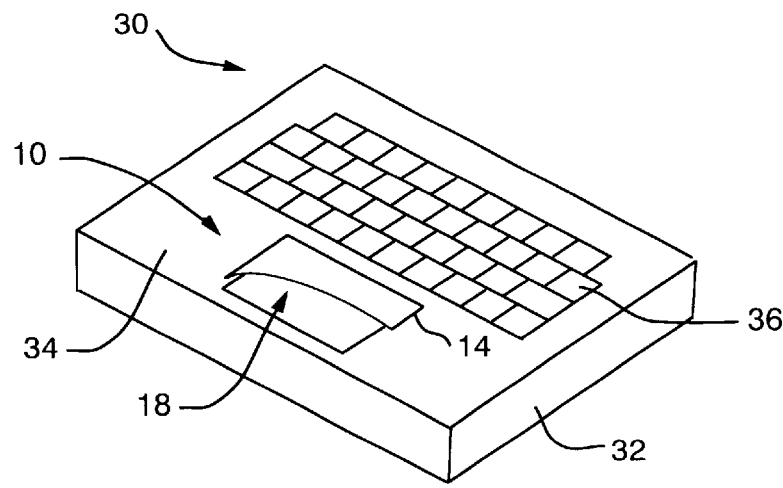
FIG. 6 is a perspective view of a touch pad guard integrally coupled to the surface of the portable computer keyboard, according to a further embodiment of the present invention.

According to a further embodiment, the touch pad guard 10, FIG. 6, is integrally attached to the keyboard housing 32. The touch pad guard 10 can be molded into the keyboard housing 32 or integrally attached according to any other attachment technique. The touch pad guard member 14 in this embodiment is shown having the open region 18 to the right side to better accommodate a right handed user.

Figure 7:
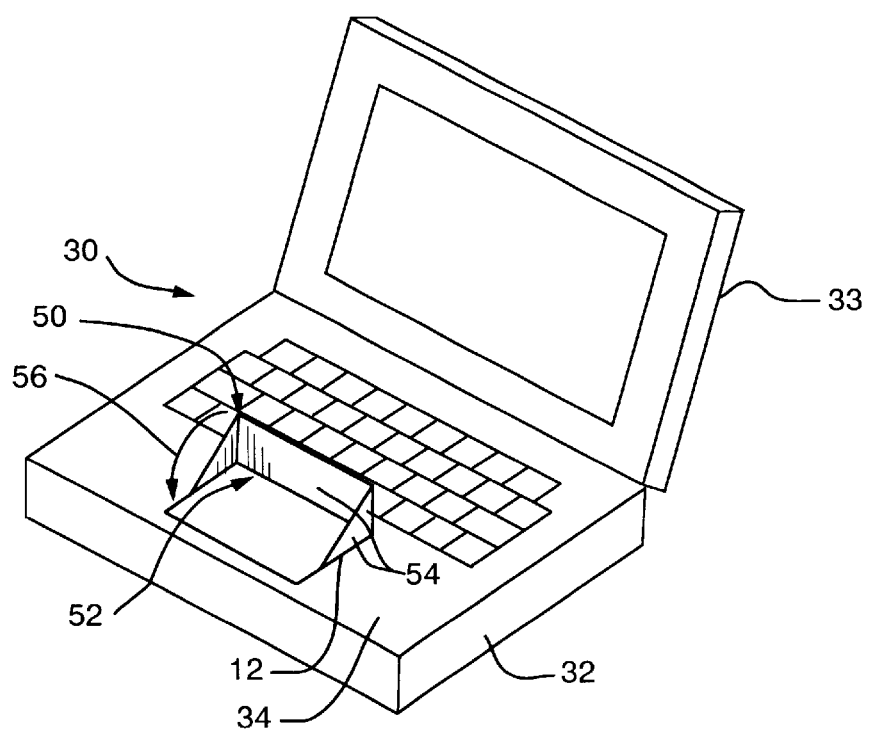
FIG. 7 is a perspective view of a touch pad guard, according to yet another embodiment of the present invention.

Another embodiment of the touch pad guard member 50, FIG. 7, includes a generally open top region 52 and generally straight side regions 54. Although this touch pad guard member 50 is shown generally perpendicular to the surface 34, the touch pad guard member 50 according to this embodiment can also be disposed at an angle with respect to the surface 34 to partially extend over the touch pad 12. This touch pad guard member 50 can also be retractable, for example, by sliding into the keyboard housing 32 or by pivoting against the keyboard housing 32 in the direction of arrow 56. The touch pad guard 50 can retract to allow the computer screen 33 to be closed or when the user's hand is resting on the touch pad guard 50.

Figure 8:
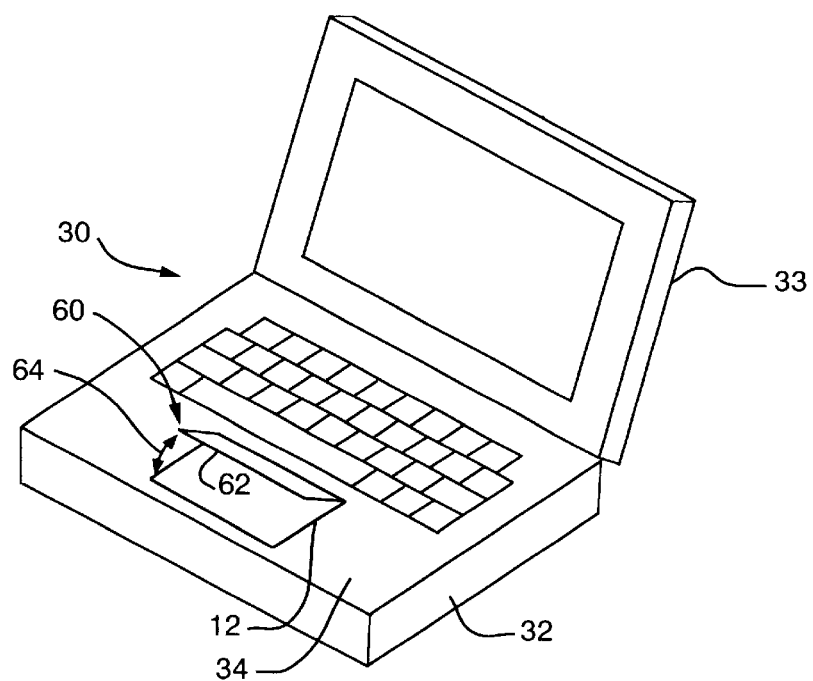
FIG. 8 is a perspective view of a retractable touch pad guard pivotably coupled to a portable computer keyboard, according to yet another embodiment of the present invention.
Figure 9:
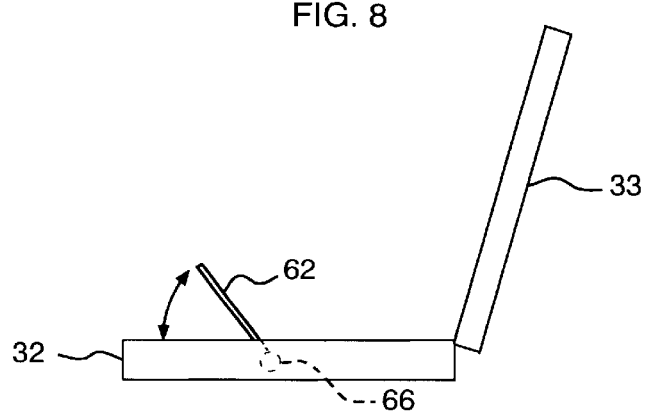
FIG. 9 is a side view of the retractable touch pad guard shown in FIG. 8.
Figure 10:
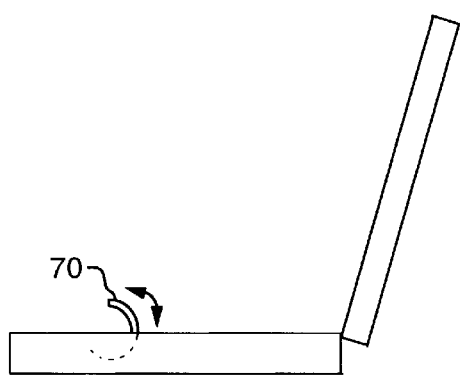
FIG. 10 is a side view of a retractable touch pad guard, according to another embodiment of the present invention.

A further embodiment of the touch pad guard member 60, FIGS. 8 and 9, has a single generally flat side region 62 that extends generally at an angle with respect to the surface 34. This touch pad guard member 60 preferably pivots, as shown by arrow 64, from a retracted position against the touch pad 12 to an in-use position allowing access to the touch pad 12. The attachment device includes a spring-biased pivoting mechanism 66, FIG. 9, biasing the touch pad guard member 60 to the in-use position and allowing the touch pad guard member 60 to move to the retracted position, for example, when the computer screen 33 closes. According to yet another embodiment, a retractable touch pad guard member 70, FIG. 10, has a generally semi-circular shape and rotates between the retracted position and in-use position. The retractable touch pad guards can use any conventional mechanisms for moving the guards between the retracted and in-use positions.

Accordingly, the touch pad guard of the present invention allows a user to type on a computer keyboard having a touch pad without inadvertently contacting the touch pad, while still allowing the user's hand to access the touch pad for movement of the cursor. The touch pad guard of one embodiment further provides an integrated wrist pad for supporting the user's wrists and preventing injury to the user. The touch pad guard can also be integrated with a portable computer and can be retractable to facilitate closing of the portable computer.

Modifications and substitutions by one of ordinary skill in the art are considered to be within the scope of the present invention which is not to be limited except by the claims which follow.

What is claimed is:

1. A touch pad guard comprising:
   a bottom region adapted to be disposed generally about a portion of a perimeter of a touch pad on a keyboard such that said bottom region generally does not contact said touch pad;
   a top region having a portion adapted to be disposed on top of at least a portion of said touch pad such that while said touch pad guard is disposed on said keyboard, said top region prevents a user's hand from inadvertently contacting said touch pad while providing said user's hand generally unrestricted access to a plurality of keys of said keyboard; and an open region adapted to receive at least one finger of a user and to allow said user to deliberately access to said touch pad while said touch pad guard is disposed on said keyboard wherein said touch pad guard does not overlie any portion of said plurality of keys and prevents accidental contact with said touch pad.

2. The touch pad guard as claimed in claim 1 wherein said touch pad guard further includes at least two support members extending generally from a first and a second side region of said touch pad guard.

3. The touch pad guard as claimed in claim 1 wherein said touch pad guard further includes an attachment device for attaching said touch pad guard to said keyboard.

4. The touch pad guard as claimed in claim 1 wherein said top region is generally closed.

5. The touch pad guard as claimed in claim 4 wherein said closed top region is rounded.

6. The touch pad guard as claimed in claim 1 wherein said touch pad guard further includes three closed side regions.

7. The touch pad guard as claimed in claim 1 wherein said open region is disposed generally in a front region of said touch pad guard.

8. The touch pad guard as claimed in claim 7 wherein said open region faces generally towards a first side region of said touch pad guard.

9. A touch pad guard comprising:

a bottom region adapted to be disposed generally about a portion of a perimeter of a touch pad on a keyboard such that said bottom region generally does not contact said touch pad;

a top region having a portion adapted to be disposed on top of at least a portion of said touch pad such that while said touch pad guard is disposed on said keyboard, said top region prevents a user's hand from inadvertently contacting said touch pad while providing said user's hand generally unrestricted access to a plurality of keys of said keyboard;

an open region adapted to receive at least one finger of a user and to allow said user to deliberately access to said touch pad while said touch pad guard is disposed on said keyboard; and at least two support members extending generally from a first and a second side region of said touch pad guard, wherein said touch pad guard does not overlie any portion of said plurality of keys and prevents accidental contact with said touch pad.

10. The touch pad guard as claimed in claim 9 wherein said touch pad guard further includes three closed side regions.

11. The touch pad guard as claimed in claim 10 wherein said open region is disposed generally in a front region of said touch pad guard.

12. The touch pad guard as claimed in claim 11 wherein said open region faces generally towards a first side region of said touch pad guard.

13. The touch pad guard as claimed in claim 9 wherein said top region is generally closed.

14. The touch pad guard as claimed in claim 13 wherein said closed top region is rounded.

* * * * *